Feb. 26, 1963    R. S. MICHELS, JR    3,079,162
STROLLER CONVERTIBLE TO WALKER AND CARRIAGE
Filed Aug. 3, 1961                                         2 Sheets-Sheet 1
FIG.1
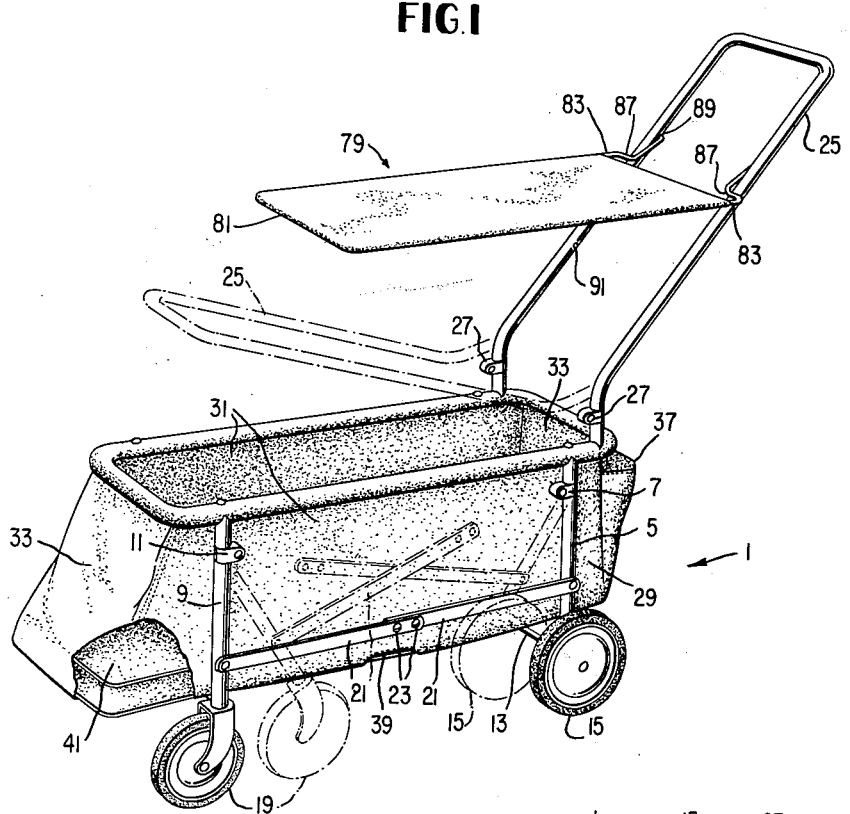
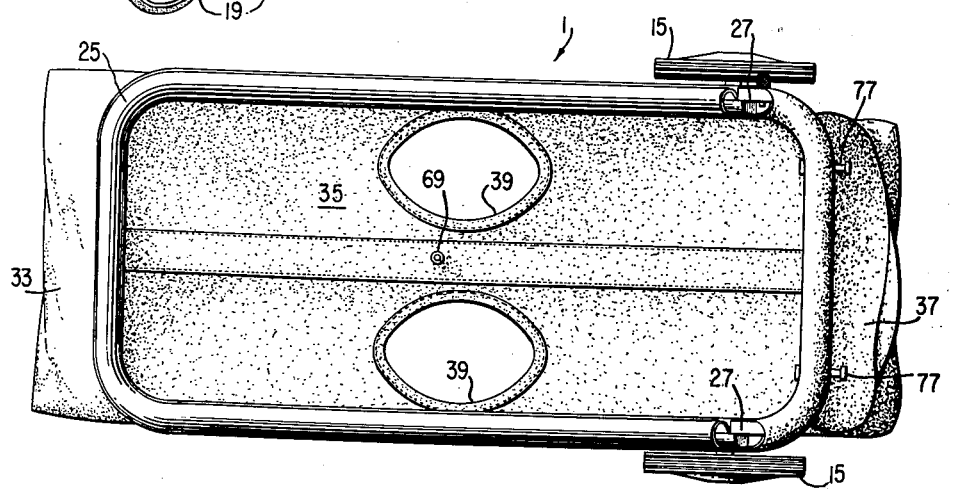
FIG.3
INVENTOR.
ROY S. MICHELS, JR.
BY *Shanley & O'Neil*
ATTORNEYS Feb. 26, 1963 R. S. MICHELS, JR 3,079,162
STROLLER CONVERTIBLE TO WALKER AND CARRIAGE
Filed Aug. 3, 1961 2 Sheets-Sheet 2
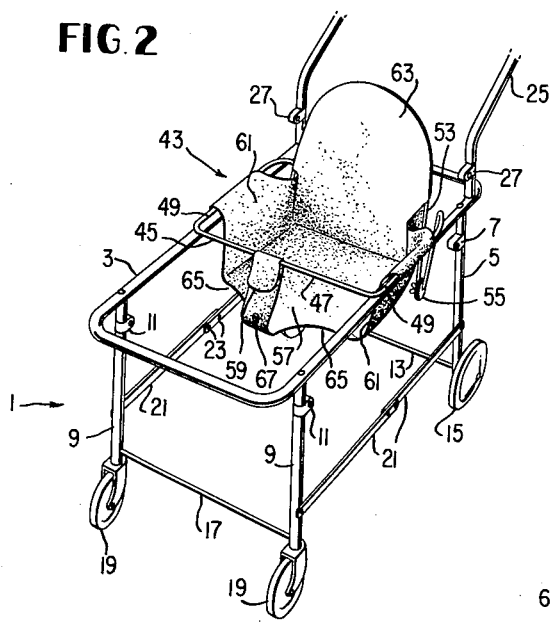
FIG. 2
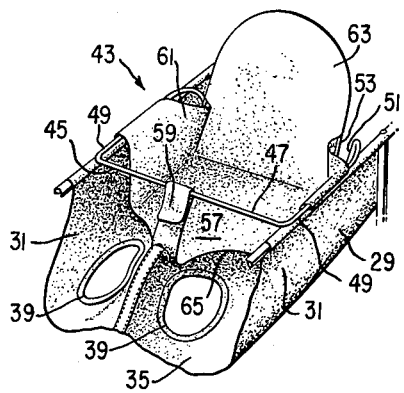
FIG. 4
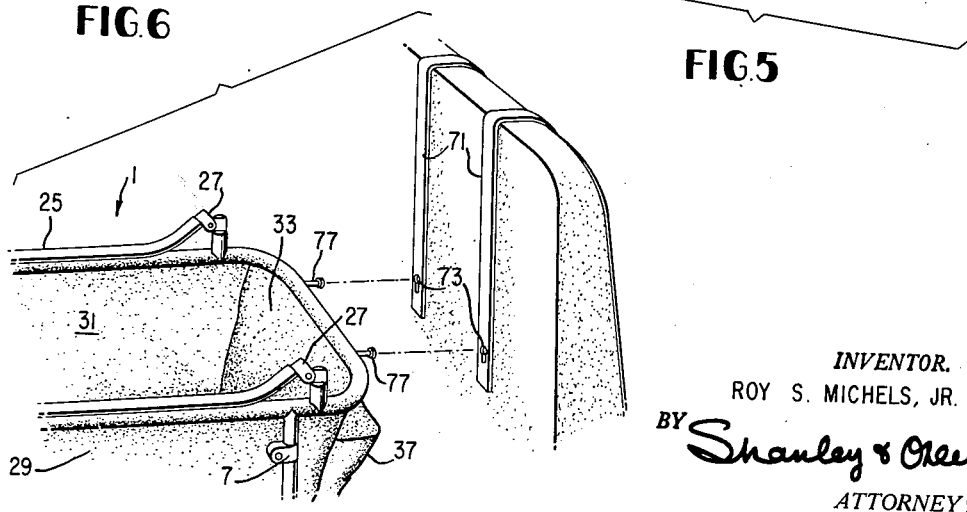
FIG. 6
FIG. 5
INVENTOR.
ROY S. MICHELS, JR.
BY Shanley & O'Neil
ATTORNEYS

United States Patent Office 3,079,162
Patented Feb. 26, 1963

3,079,162
STROLLER CONVERTIBLE TO WALKER
AND CARRIAGE
Roy S. Michels, Jr., 1820 Hillcrest Ave., Lake Worth, Fla.
Filed Aug. 3, 1961, Ser. No. 129,113
1 Claim. (Cl. 280—7.1)

The present invention relates to a convertible conveyance for children, and more particularly to a device convertible to perform the functions of any of a stroller, walker, carriage, car seat and car bed.

The parents of infants and young children are confronted by the problem of providing for the child a number of rather expensive devices within a short period of time. Among these are a car seat, a car bed, a carriage, a stroller and a walker.

Accordingly, it is an object of the present invention to provide a single basic conveyance that can be readily converted from one to another of the five devices listed above so that one purchase will serve for all purposes.

Another object of the present invention is to provide a convertible conveyance for children, which will be relatively simple and inexpensive to manufacture, easy to assemble, disassemble, store and convert, and rugged and durable in use.

Other objects and advantages of the present invention will become apparent from a consideration of the following description, taken in connection with the accompanying drawings, in which:

FIGURE 1 is a perspective view of a wheeled carriage according to the present invention, with parts broken away and with other parts shown in phantom line in alternate positions;

FIGURE 2 is a view similar to FIGURE 1 but showing only the frame of the carriage and showing a seat in place on the frame of the carriage;

FIGURE 3 is a plan view of the carriage with mattress removed;

FIGURE 4 is a fragmentary perspective view showing the special coaction between the seat and the basket of the carriage;

FIGURE 5 is an exploded fragmentary perspective assembly view showing the device in use as a car seat; and FIGURE 6 is a view similar to FIGURE 5 but showing the device in use as a car bed.

Referring now to the drawings in greater detail, there is shown a child's convertible conveyance comprising a carriage 1 having an open-work frame 3 that is generally rectangular and elongated in the direction of movement of the carriage. Frame 3 is supported by four legs, there being a pair of legs 5 adjacent one end of frame 3 having joints 7 adjacent their upper end by which legs 5 may collapse by swinging forward and upward. A pair of legs 9 adjacent the other end of frame 3 are provided with joints 11 adjacent their upper ends so that legs 9 may collapse by swinging upward to the rear about joints 11.

Adjacent their lower ends, legs 5 carry between them an axle 13 that passes through and extends outward beyond the lower ends of legs 5. A wheel 15 is mounted on each outwardly extending end of axle 13 for rotation about a horizontal axis. At the other end of frame 3, a brace 17 extends between and rigidly interconnects legs 9 adjacent their lower ends. At their lower ends, legs 9 carry caster wheels 19 that rotate about horizontal axes and also swivel the vertical axes of legs 9.

Axle 13 interconnects legs 5 to form a rigid subframe, while brace 17 interconnects legs 9 to form another rigid subframe. Struts 21 are pivotally mounted one on each leg 5 and 9 and extend forward from legs 5 and rearward from legs 9. The struts 21 on each side of the carriage meet and endwise overlie each other adjacent the mid portion of the carriage, and fasteners 23 removably pass through the overlapping ends of struts 21 detachably to secure struts 21 together in longitudinally aligned pairs one on each side of the carriage. In this position, each pair of longitudinally aligned struts 21 forms a rigid link which in turn forms one leg of a rigid parallelogram linkage including legs 5 and 9 and frame 3 in a vertical plane, and axle 13 and brace 17 and the other pair of struts 21 in a horizontal plane. Thus, with fasteners 23 in place, the frame of the carriage is rigid in all directions. The removal of fasteners 23, however, permits the legs of the carriage to be collapsed in the manner shown in broken line in FIGURE 1.

Carriage 1 is provided with an upwardly extending handle 25 adjacent the rear thereof, by which the carriage may be pushed along on its wheels. Handle 25 has joints 27 adjacent its lower ends about which handle 25 may be folded forward down flat on frame 3 when it is desired to store the device or to use it for other purposes to be described.

Frame 3 supports a downwardly depending flexible basket 29 disposed generally within the confines of frame 3. Basket 29 may for example be of heavy canvas secured substantially entirely about its upper edge to the frame 3 and depending within the frame of the carriage between legs 5 and 9 and above axle 13 and brace 17 and between the opposite pairs of struts 21. Basket 29 has a pair of side walls 31 one on either side thereof and a pair of end walls 33 one at either end thereof. Basket 29 also has a bottom 35 integral along its outer edges with the lower edges of side walls 31 and end walls 33. Bottom 35 is of a length greater than the length of frame 3 and projects endwise outward beyond each end of frame 3. Therefore, end walls 33 are not vertical but are inclined from frame 3 downward and outward toward the corresponding ends of bottom 35. The rear end wall 33 is provided with a carrying pouch 37 that provides a convenient pocket for various items such as those carried for use by the child.

Bottom 35 of basket 29 is provided with a pair of laterally spaced-apart leg openings 39 extending therethrough about midway of the length of bottom 35. A mattress 41 of about the same length as bottom 35 removably fits in the bottom of the basket 29 on bottom 35 and in that position closes leg openings 39.

Removably supported on carriage 1 is a seat 43 having a U-shaped frame 45 that extends forward to a front intermediate portion 47 having at each end thereof a rearwardly extending arm 49. Arms 49 rest on the sides of frame 3 substantially the full length of arms 49 but over only a medial portion of the side members of frame 3. Arms 49 terminate at their rear in downwardly extending frame portions 51 by which the front of the seat is interconnected with a downwardly opening U-shaped back frame 53. Downwardly extending frame portions 51 and back frame 53 are interconnected at their lower ends by joints 55 for relative swinging movement about a common horizontal axis to open the seat or to collapse it for storage.

Seat 43 carries a flexible pouch 57 depending therefrom and including a front strap 59 which is secured to front portion 47 of forward frame 45. Pouch 57 also includes side portions 61 that are secured to arms 49 of frame 45 and a back portion 63 that forms a pocket at its upper end that slips over the upper end of back frame 53. Front strap 59 and side portions 61 are so disposed and spaced apart as to define a pair of leg openings 65 therebetween, through which the legs of a child may extend, beneath the frame 45.

Front strap 59, which is between leg openings 65, carries on its underside a snap 67 that coacts with a snap 69 on the upper side of bottom 35 of basket 29 of the carriage, between leg openings 39 therethrough. The detachable interengagement of snaps 67 and 69 provides fastener means adjacent the margins of the pouch openings and adjacent the margins of the basket openings to maintain the pouch and basket openings closely adjacent each other when mattress 41 is removed so that a child's legs may extend easily not only through leg openings 65 of the seat but also through leg openings 39 of the carriage.

The conveyance of the present invention also includes means for adapting each of carriage 1 and seat 43 for use as a car bed or a car seat, respectively. Such means comprise a pair of hooks 71 which may be stored in carrying pouch 37 at the rear of the carriage when not in use. Hooks 71 are adapted to fit over and be supported on the top of an automobile seat backrest. Adjacent its lower end, each hook 71 is provided with a keyhole slot 73 therethrough. Seat 43 carries a pair of lugs 75 extending rearward therefrom and having enlarged heads. Each lug 75 is fixedly secured adjacent the upper end of a downwardly extending frame portion 51, there being a lug 75 on each side of the seat. Similarly, there is a pair of lugs 77 on frame 3 of carriage 1, spaced apart and extending rearward. In the illustrated embodiment, lugs 77 are on the rear portion of frame 3, but they of course could also be on the side portion or on both the rear and the side portions so as to adapt the carriage to be mounted either lengthwise or sidewise in a car. Lugs 75 and 77 extend through and are removably secured in the bottoms of keyhole slots 73, so that when the lugs and slots are thus engaged, seat 43 may be used as a car seat, preferably on the front side of the backrest, or the carriage may be used as a car bed, preferably on the rear side of the backrest either parallel or transverse thereto. When the carriage is used as a car bed, it is preferred to leave the struts 21 interengaged to maintain a rigid frame so as to give a measure of protection to the child, and also to permit wheels 15 or 19 to rest on the rear seat and further support the car bed.

The present conveyance also includes an adjustable canopy 79 comprising a generally U-shaped frame 81 having a pair of legs 83, and a flexible cloth cover 85 that slips over frame 81. Legs 83 terminate rearward in right-angle portions in the form of elbows 87 that rest against handle 25 to support the canopy, the legs then proceeding diagonally upward and terminating in outturned free ends that are removably received in holes 89 on the inner sides of each side portion of handle 25. Canopy 79 is thus resiliently detachably supported on handle 25, it being necessary only to press legs 83 toward each other slightly to deform frame 81 in order to remove the free ends of the legs from holes 89.

An alternate set of holes 91 positioned like holes 89 but at a substantially lower level along handle 25 is provided for detachably mounting the canopy on the conveyance at a lower level. The upper mounting of the canopy, in holes 89, is for use when the device is used as a stroller or as a walker. The lower mounting of the canopy, in holes 91, is for use when the device is used as a carriage. In each case, the canopy thus gives maximum protection from the sun without striking the head of the infant. Although the conveyance is shown for use as a carriage in FIGURE 1, the canopy is nevertheless shown in the raised position in that figure for clarity of illustration.

It will now be apparent that a child's conveyance of considerable versatility has been provided. In the position shown in FIGURE 1, with the handle raised and the mattress in place, the leg openings 39 are closed and the device serves as a carriage. With the seat 43 added as in FIGURE 2, and the mattress still in place, the leg openings 39 remain closed but a child may sit in seat 43 with his legs extending through leg openings 65 thereof and resting on mattress 41, whereupon the device serves as a stroller. With mattress 41 removed and snaps 67 and 69 snapped together so that the bottom 35 of flexible basket 29 is drawn up away from the ground and leg openings 39 and 65 are in registry with each other, the child can sit in the seat and reach the ground with his feet, so that the device serves as a walker. It is also important to note that seat 43 can be positioned either as in FIGURES 2 and 4 or reversed, that is, facing toward handle 25. Thus, if the infant is fussing or the wind is blowing or the sun shining in the infant's face, the seat can simply be turned without removing the infant, who can thereafter ride facing in the opposite direction. With seat 43 removed from carriage 1 and the lugs 75 engaged in keyhole slots 73 of hooks 71 supported on an automobile seat backrest, the device serves as a car seat; while with seat 43 removed and carriage 1 supported with its lugs 77 in keyhole slots 73 of hooks 71 on an automobile seat backrest, the device serves as a car bed.

It is also to be noted that when seat 43 or hooks 71 are not in use, they may be stored in carrying pouch 37.

In view of the foregoing disclosure, it will be obvious that all the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

A convertible conveyance for children, comprising a wheeled frame, a flexible basket carried by the frame, a seat having a frame removably resting on the wheeled frame and a flexible pouch carried by the seat frame, the pouch and the basket each having a pair of leg openings therethrough, a mattress removably supported in the bottom of the basket and closing the basket leg openings, whereby when the seat is supported by the wheeled frame and the mattress is supported by the basket the device serves as a stroller, and when the seat is supported by the wheeled frame and the mattress is removed a child's legs may extend through the openings both of the pouch and of the basket so that the device serves as a walker, and when the seat is removed and the mattress is supported in the basket the device serves as a carriage, and fastener means adjacent the margins of the pouch openings interengageable with fastener means adjacent the margins of the basket openings to maintain the pouch and basket openings closely adjacent each other when the device is used as a walker.

References Cited in the file of this patent

UNITED STATES PATENTS

| | | |
|---|---|---|
| 2,300,425 | Kiesow | Nov. 3, 1942 |
| 2,902,286 | Wood | Sept. 1, 1959 |
| 2,982,562 | Gladstein | May 2, 1961 |